Feb. 13, 1962 E. H. HILL 3,020,783
CHAIN SAW SHARPENER
Filed Dec. 8, 1958 3 Sheets-Sheet 1
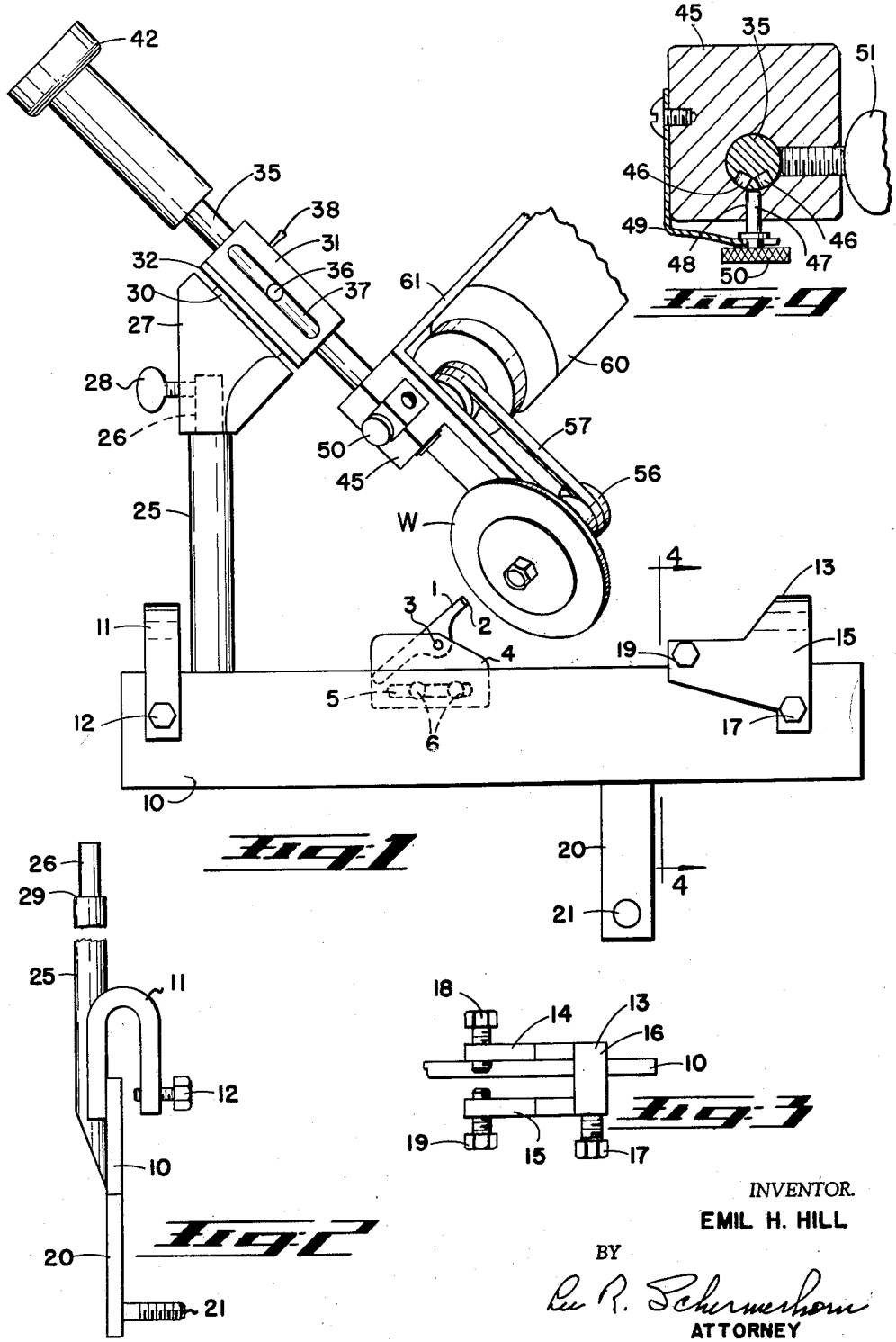
INVENTOR.
EMIL H. HILL
BY
Lu R. Schermerhorn
ATTORNEY

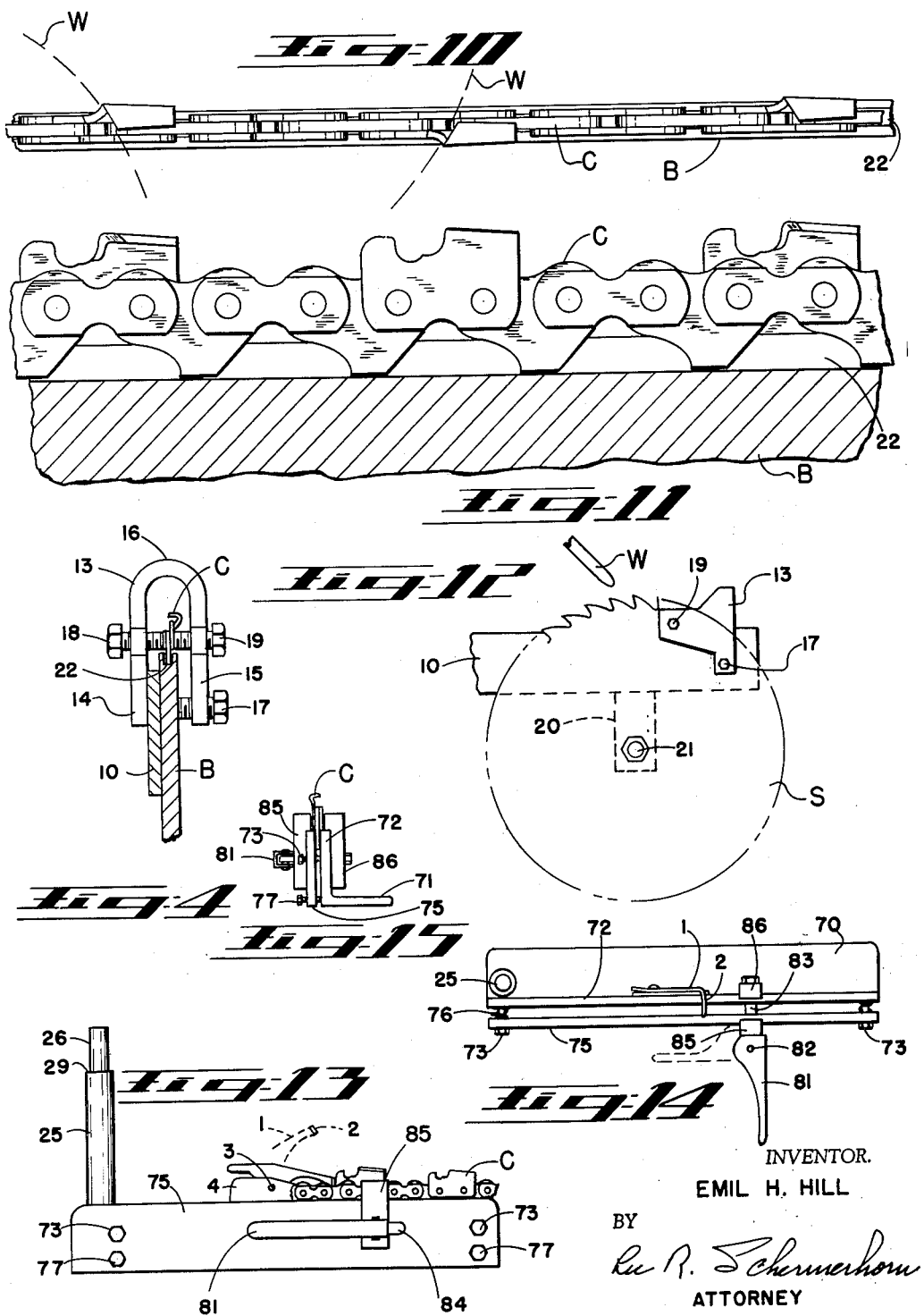

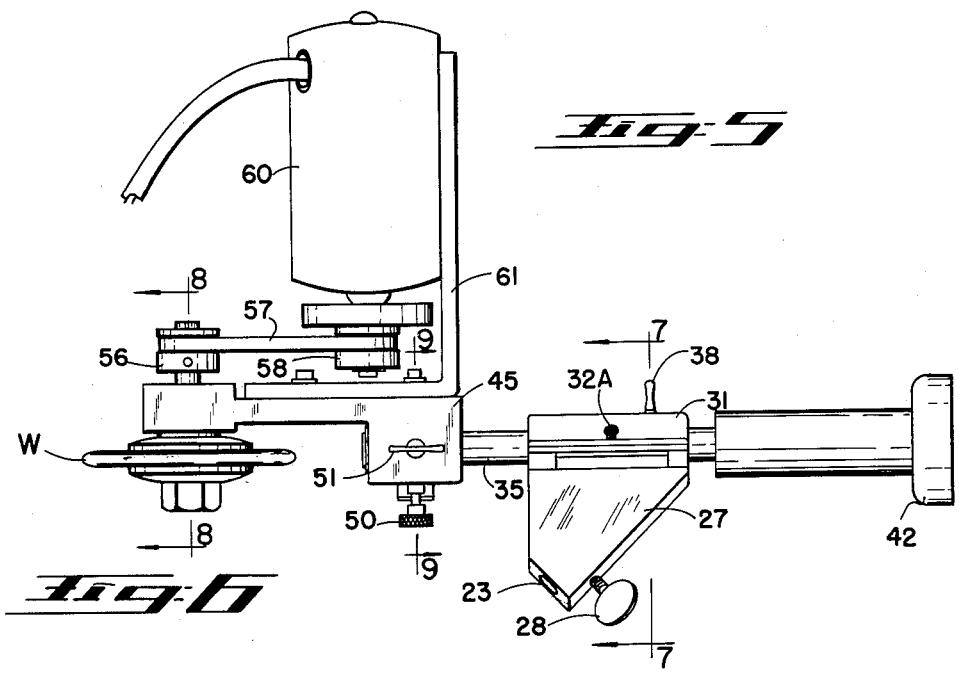
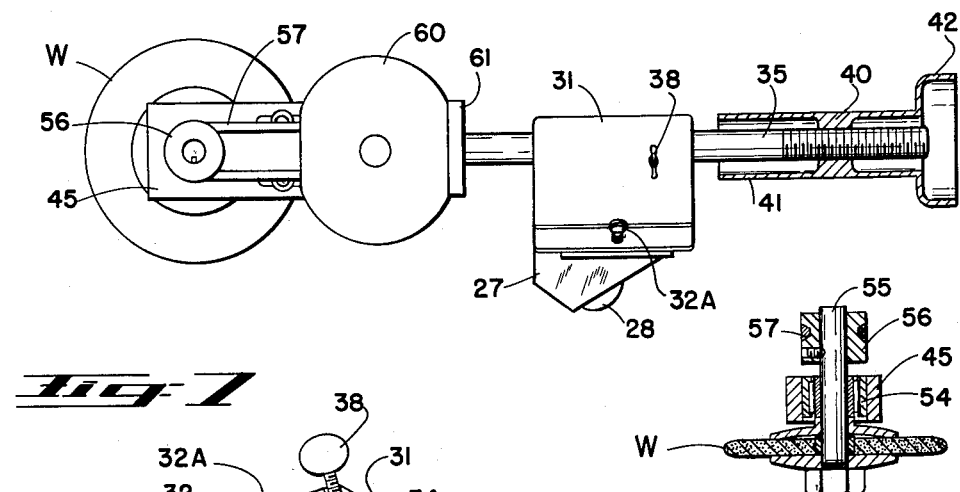
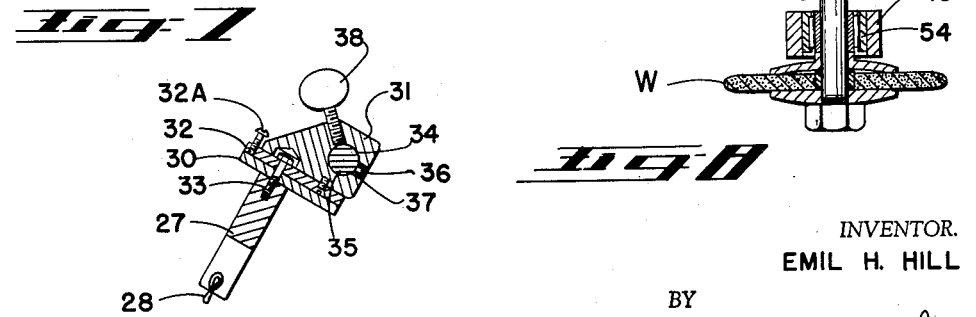

3,020,783
CHAIN SAW SHARPENER
Emil H. Hill, 6316 SE. 65th Ave., Portland, Oreg.
Filed Dec. 8, 1958, Ser. No. 778,913
1 Claim. (Cl. 76—37)

This invention relates to an improved chain saw sharpener.

It is customary in sharpening chain saws to remove the chain from the saw bar and take it to some other location where saw sharpening work is done. This necessitates taking the saw out of service for a considerable period of time or else supplying and installing an extra chain for use while the original chain is being sharpened. This may result in considerable loss of time or inconvenience, particularly in a mill where the saw chain may require sharpening during shut-down intervals, such as lunch periods and the like. Also, conventional chain saw sharpening equipment does not do the job as quickly as may be desired where out-of-service time is an important factor.

Two different types of cutter teeth have been generally adopted for chain saws. These types are identified as the chisel bit and the chipper bit. The former is superior in its cutting action but must be hand filed because conventional grinding machines are suitable only for the chipper bit. Hence, the less desirable type of cutter tooth is widely used because it can be sharpened on available grinding machines.

Objects of the present invention are, therefore, to provide a chain saw sharpener which may be taken to the work so that the work will not have to be taken to the sharpener, to provide a chain saw sharpener which may be mounted and operated on the saw bar without removing the chain therefrom, to provide a chain saw sharpener which is quick and accurate in its operation, to provide a sharpener which requires less skill to operate than conventional sharpeners, to provide a sharpener which will sharpen various kinds and shapes of cutter teeth used on chain saws and also circular saws, to provide a sharpening device which will hollow grind chisel bit teeth, to provide a grinding wheel which can be dressed to different shapes for different types of cutters, to provide a chain saw sharpener which affords the option of sharpening the saw chain either on the cutter bar of the saw or removed from the cutter bar and to provide a device of the type described which is relatively simple and economical to manufacture, easy to use and durable and reliable in operation.

The present device comprises a novel support structure for a disc shape grinding wheel permitting the wheel to be brought into engagement with the cutter teeth at different angles appropriate for different kinds and shapes of teeth. The supporting mechanism is arranged so that the inclination of the grinding wheel may be readily shifted from one position to another in sharpening the right and left cutter teeth on a chain saw and may be adjusted to a still different position for sharpening a circular saw. Two different base supports are provided for the grinder, one being adapted to be clamped directly on the saw bar, or blade, of a chain saw and the other being adapted to hold a chain which has been removed from the saw bar.

The foregoing and other objects and advantages will be apparent and the invention will be more fully understood from the following description of the embodiments illustrated on the accompanying drawings. It is to be understood, however, that various changes may be made in the construction and arrangement of parts and that all such modifications within the scope of the appended claim are included in the invention.

In the drawings:

FIGURE 1 is a side elevation view of the complete device showing a supporting base which is adapted to be mounted on the saw bar and showing the motor and grinding wheel approximately in a normal inclined grinding position;

FIGURE 2 is an end elevation view of the supporting member shown in FIGURE 1;

FIGURE 3 is a fragmentary top plan view of a portion of the supporting member shown in FIGURE 1;

FIGURE 4 (Sheet 3) is a sectional view taken on the line 4—4 of FIGURE 1;

FIGURE 5 is a side elevation view of the operating mechanism of FIGURE 1 removed from its supporting base and disposed in horizontal position with the axes of the motor and grinding wheel parallel with the plane of the view;

FIGURE 6 is a top plan view of the operating mechanism shown in FIGURE 2;

FIGURE 7 is a sectional view taken on the line 7—7 of FIGURE 5;

FIGURE 8 is a sectional view taken on the line 8—8 of FIGURE 5;

FIGURE 9 (Sheet 1) is a sectional view taken on the line 9—9 of FIGURE 5;

FIGURE 10 is a fragmentary top plan view showing the relationship of the grinding wheel to the cutter teeth of a saw chain;

FIGURE 11 is an elevation view with parts broken away further illustrating the position of the grinding wheel in relation to the saw chain;

FIGURE 12 is a fragmentary side elevation view similar to FIGURE 3, showing application of the device in sharpening a circular saw;

FIGURE 13 is a side elevation view of a second base support which is adapted to receive a saw chain removed from the saw bar;

FIGURE 14 is a top plan view of the base support shown in FIGURE 13; and

FIGURE 15 is an end elevation view of the base support shown in FIGURE 13.

Referring first to FIGURE 1, the numeral 10 designates a flat base plate which is adapted to be mounted on the flat bar or blade of a chain saw about which the chain travels on a pair of end sprocket wheels. One end of this plate carries a C clamp 11 having a clamp screw 12 as shown in FIGURE 2.

The other end of the plate 10 is equipped with a C clamp 13 having one leg 14 welded or otherwise secured to the plate 10 and a second leg 15 disposed in spaced relation to the opposite side of plate 10 as shown in FIGURES 3 and 4. The legs 14 and 15 are interconnected by a top bridge portion 16. A saw bar clamp screw 17 is provided at the lower extremity of leg 15 in a position below the top edge of plate 10. A pair of aligned clamp screws 18 and 19 are mounted in portions of the respective legs 14 and 15 which project slightly above the top edge of plate 10.

FIGURE 4 shows a saw bar B which is clamped against plate 10 by clamp screws 12 and 17. The saw bar is equipped with the usual longitudinal groove or channel 22 to support and guide lower root portions of certain of the links of the saw chain C as further shown in FIGURE 11. Before tightening the saw bar clamp screws 12 and 17, the saw bar is adjusted vertically so that it will be at the proper height for engagement of clamp screws 18 and 19 with opposite sides of one of the cutter links of the saw chain. The clamp screws 18 and 19 are axially aligned with each other and thus may be tightened against opposite sides of a cutter link to be sharpened to hold the link rigid. After one link has been sharpened, the chain is advanced to bring the next cutter link which is to be sharpened between the clamp screws 18 and 19 for similar securement and so on.

In order to index each cutter link in proper position for sharpening by the grinding wheel W an index finger 1 is provided, as shown in FIGURE 1. Finger 1 has a bent end 2 adapted to engage a chain link, the finger being pivotally mounted at 3 on an upstanding adjustment plate 4. Plate 4 is equipped with a horizontal slot 5 through which pass a pair of clamp screws 6 in plate 10.

Referring again to FIGURE 1, the base plate 10 is further equipped with a depending hanger strap 20 equipped with a bolt or threaded stud 21 for supporting a circular saw S, as shown in FIGURE 12. Hanger strap 20 is spaced a short distance along the plate 10 from clamp 13 so that the saw S will be disposed within clamp 13 in a position to be secured by the opposed clamp screws 18 and 19 adjacent the tooth engaged by the grinder. The clamp screw 17 is not necessary with the circular saw and may be backed off so that it will not conflict with the saw.

The base plate 10 is further equipped adjacent the clamp 11 with a vertical post 25 having a reduced cylindrical upper end 26 approximately in the plane of the saw forming a bearing portion for pivotally supporting the sharpening mechanism. This mechanism is carried by a swivel angle bracket 27 (FIGURE 1) having a bore 23 with a setscrew 28 engageable with the bearing portion 26. The lower end of bracket 27 rests on a shoulder 29 whereby the sharpening mechanism now to be described may rotate on this shoulder about the vertical axis of post 25.

Angle bracket 27 is equipped with an inclined bearing plate 30 having a flat upper bearing surface inclined at 45° from the horizontal. A swivel head 31 is pivotally mounted on a pin 33 perpendicular to bearing plate 30 and is equipped with its own bearing plate 32 to turn on the bearing plate 30 whereby the head 31 is rotatable in an inclined plane parallel with the plates 30, 32 relative to the bracket 27 as well as being rotatable with the bracket 27 in a horizontal plane. Head 31 may be locked against swivel movement on pin 33 by means of a setscrew 32a in plate 32 which may be tightened against plate 30. These details are further illustrated in FIGURE 7.

Head 31 is equipped with a cylindrical bore 34 containing a slidable arm 35. Rotation of arm 35 in the bore is prevented by a pin 36 which is slidable in a slot 37 in the block 31. This sliding movement may be locked by a setscrew 38 in the block 31. The sliding movement is limited in its downward direction in FIGURE 1 by an adjusting nut 40 which may be screwed to different desired positions on the upper threaded end of arm 35. The nut 40 includes a tubular sleeve 41 spaced from arm 35 and elongated on both sides of nut 40, this sleeve carrying at its upper end an enlarged handle 42 for manipulating convenience. In the drawings, sleeve 41 is shown spaced from head 31 but in use the arm 35 would normally slide down by gravity until sleeve 41 engages head 31, except when the arm is manually retracted or clamped by screw 38.

The lower end of arm 35 carries a tool holder block 45. Within block 45 the arm 35 has a pair of holes 46 to receive the end of a pin 47 which projects through a round hole 48 in block 45. Pin 47 is normally urged into a hole 46 by a spring 49 but may be retracted by a knurled head 50 on the pin. Thus, when the pin 47 is engaged in a hole 46, the block 45 will not rotate on arm 35 and longitudinal movement of the block on the arm is also prevented. Block 45 may be clamped in any other position on rod 35 by means of thumbscrew 51.

Tool holder block 45 includes an arm portion extending beyond the lower end of arm 35 and equipped with a bearing 54 for a shaft 55 for the grinding wheel W, as shown in FIGURE 8. Mounted on the shaft 55 is a pulley 56 which is driven by a belt 57 from a drive pulley 58 on an electric motor 60. Motor 60 is mounted on an angle bracket 61 on the tool holder block 45.

Thus, using the motor 60 and nut 40, 42 as convenient handles, the grinding wheel W may be swung in an arc about the vertical axis of post 25, FIGURE 1, or it may be swung in an arc about the inclined axis of pin 33 in FIGURE 7, depending upon the type of teeth to be sharpened. When the latter pivotal movement is employed, movement on the post 25 is locked by setscrew 28 and when pivotal movement on the post is desired, pivotal movement on the pin 33 is locked by setscrew 32a. Suitable stops may be provided for both pivotal movements, if desired.

With either type of movement the position of grinding wheel W may be adjusted toward and away from the base plate 10 by means of nut 40, this nut permitting retraction of the grinding wheel at all times without disturbing the adjustment of the nut. In shifting the grinding wheel from one side of the saw chain to the other, angle bracket 27 may be lifted off its bearing seat 29, if desired.

In sharpening the cutting teeth on a chain saw, it is usually necessary to tilt the grinding wheel W out of a plane perpendicular to the plane of the view in FIGURE 1, the grinding wheel of disc shape being shown so tilted in this view. This is accomplished by rotating the tool holding block 45 on arm 35 in FIGURE 9 until pin 47 engages one of the holes 46. This position of the grinding wheel would be appropriate, for example, in sharpening the right-hand cutter links as viewed in FIGURES 10 and 11. Then, for sharpening the left-hand cutter links, the pin 47 is retracted and tool holder block 45 is rotated until the pin engages the other hole 46, whereupon the grinder wheel will then be tilted an equal angle in the opposite direction from a plane perpendicular to the plane of the view in FIGURE 1. In the two working positions of the grinding wheel W shown in FIGURE 10, the arm 35 extends approximately, but not exactly, in the plane of the saw.

The facility with which the grinding wheel may be swung across the saw bar and tilted from its position for grinding right-hand cutter links to its position for grinding left-hand cutter links facilitates the sharpening of these cutters one after another on the chain instead of first sharpening all the right-hand cutter links and then afterwards sharpening the left-hand cutter links as usually must be done on conventional sharpening machines because of the inconvenience in changing the tilt of the grinding wheel and shifting it to the opposite side of the saw after each cutter sharpening operation. Since the inclination or tilt of the grinding wheel is definitely determined in each position by the two holes 46, it is ordinarily not necessary to tighten the thumbscrew 51 before bringing the grinding wheel into engagement with the cutter link.

The saw bar B and its chain C are included in FIGURE 4 to show how the bar and chain links are separately clamped. The saw bar and chain are omitted in FIGURES 1, 2 and 3, however, for clarity of illustration of the support structure.

For sharpening a circular saw, it is usually desirable to position the grinding wheel perpendicular to the plane of the saw, as shown in FIGURE 12. This intermediate position of the grinding wheel is represented in FIGURE 9 where it will be observed that the pin 47 reposes midway between the two holes 46. In order to hold the grinding wheel in such position, the tool holder block must be clamped on arm 35 by means of thumbscrew 51. In sharpening a circular saw, the base plaate 10 may be supported in a bench vise or other suitable means. In working position, the arm 35 is disposed approximately in the plane of the saw.

An advantage of the present disc type grinding wheel over the small cylindrical type of grinder heretofore proposed is that the edge of the disc may be dressed to different shapes appropriate for certain tooth shapes that cannot be sharpened by a cylindrical grinder. As previously mentioned, for example, the present device will hollow grind chisel bit cutters which cannot be sharpened on any other presently available machine.

FIGURES 13, 14 and 15 show a base member 70 for holding a saw chain removed from the saw bar. Base member 70 comprises an angle iron having a horizontal flange 71 adapted to be bolted or clamped to a bench top and a vertical flange 72 equipped with a pair of headed pins or studs 73 for loosely supporting a clamping plate 75. Compression coil springs 76 on the studs 73 normally urge plate 75 away from vertical flange 72. The lower edge of plate 75 is equipped with setscrews 77 to hold the lower edge of the plate spaced from vertical flange 72. The heads of pins 73 maintain a maximum spacing between the upper edge of plate 75 and flange 72 approximately equal to the width of channel 22 in the saw bar, the width of this slot being exaggerated in FIGURE 14. Thus, the saw chain may be drawn across the top of plate 75 and flange 72 with the root ends of the links travelling in the intervening space in the same manner as the chain travels in the groove or channel of the saw bar.

In order to position each cutter link in the proper location longitudinally for engagement by the grinding wheel, an L-shaped index finger 1 is pivotally mounted at 3 on a plate 4. Plate 4 is equipped with horizontal slots, not shown, whereby this plate may be clamped securely in longitudinally adjusted position against flange 72 by a pair of screws in the flange, as shown in FIGURE 1.

When the saw chain has been properly indexed by index finger 1, the root portions of the chain links are clamped securely between plate 75 and flange 72. This is accomplished by a cam lever 81 pivotally mounted by a transverse pin 82 in one end of a bolt 83 projecting loosely through slots 84 in plate 75 and flange 72. Bolt 83 also passes loosely through a clamp block 85 and its other end is anchored in a clamp block 86. Thus, the clamp device may be shifted longitudinally to apply the clamping pressure directly on the tooth which is being sharpened. Slot 84 is on the same level as studs 73 whereby, upon tightening of the cam lever 81 against clamp block 85, the ends of setscrew 77 come into contact with lower portions of flange 72 and act as fulcrums, causing the upper edge of plate 75 to rock into clamping engagement with the root ends of the chain links in the slot between plate 75 and flange 72. There is sufficient looseness in the connections between the parts to permit a small rocking movement as described.

When the sharpening mechanism shown in FIGURES 5 and 6 is mounted on post 25 in FIGURE 13, the device operates in the same manner as described in connection with FIGURE 1. Thus, the base 70 of FIGURE 14 is used when the saw chain is removed from the saw bar but when it is not convenient to remove the saw chain, the base 10 of FIGURE 1 is used to sharpen the chain while it remains on the saw bar. Different types of saw chains may be sharpened with either base as well as circular saws on the base 10.

Having now described my invention and in what manner the same may be used, what I claim as new and desire to protect by Letters Patent is:

In a saw sharpener, a support, an angle bracket swivel mounted on said support, means for clamping said bracket rigid with said support, a head block swivel mounted for rotation about an axis on said bracket inclined to said first axis, means for clamping said head block rigid with said bracket, an inclined arm mounted for longitudinal sliding movement in said head block, a stop nut on the upper end of said arm to limit the downward sliding movement of said arm in said head block, means to prevent rotation of said arm in said head block, a tool support mounted for rotation on the lower end of said arm about the axis of said arm, means for indexing said tool support to different rotative positions on said arm, and a grinding disc carried by said tool support with its axis perpendicular to said arm.

References Cited in the file of this patent
UNITED STATES PATENTS

| | | |
|---|---|---|
| 1,867,042 | Waller | July 12, 1932 |
| 1,874,315 | Laurent | Aug. 30, 1932 |
| 2,459,233 | Mall | Jan. 18, 1949 |
| 2,602,354 | Hutsell | July 8, 1952 |
| 2,643,553 | Evanoff | June 30, 1953 |
| 2,656,738 | Tomlin | Oct. 27, 1953 |
| 2,764,043 | Daggett | Sept. 25, 1956 |
| 2,793,544 | Rogers | May 28, 1957 |
| 2,805,587 | Goehle | Sept. 10, 1957 |
| 2,921,484 | Holst | Jan. 19, 1960 |

FOREIGN PATENTS

| | | |
|---|---|---|
| 157,978 | Sweden | Feb. 26, 1957 |
| 321,047 | Germany | May 10, 1920 |
| 889,253 | Germany | Sept. 10, 1953 |